US008643691B2

(12) United States Patent
Rosenfeld et al.

(10) Patent No.: US 8,643,691 B2
(45) Date of Patent: Feb. 4, 2014

(54) GAZE ACCURATE VIDEO CONFERENCING

(75) Inventors: Dan Rosenfeld, Seattle, WA (US); John Michael Lutian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 12/118,754

(22) Filed: May 12, 2008

(65) Prior Publication Data

US 2009/0278913 A1    Nov. 12, 2009

(51) Int. Cl.
*H04N 7/14*    (2006.01)
*H04B 1/04*    (2006.01)
*H04M 3/42*    (2006.01)

(52) U.S. Cl.
USPC .................. 348/14.01; 348/14.02; 348/14.07; 348/14.08; 455/445; 455/414.1

(58) Field of Classification Search
USPC .......... 348/14.01–14.16; 455/414.1, 417, 445
See application file for complete search history.

(56) References Cited

U.S. PATENT DOCUMENTS

| | | | |
|---|---|---|---|
| 5,400,069 A | | 3/1995 | Braun et al. |
| 5,438,357 A | * | 8/1995 | McNelley ................... 348/14.1 |
| 5,675,376 A | | 10/1997 | Andersson et al. |
| 5,801,758 A | | 9/1998 | Heirich |
| 7,116,350 B2 | | 10/2006 | Allen et al. |
| 7,119,829 B2 | | 10/2006 | Leonard et al. |
| 7,772,765 B2 | * | 8/2010 | Park et al. ...................... 313/506 |
| 2004/0196665 A1 | * | 10/2004 | Travis ........................... 362/558 |
| 2005/0024489 A1 | | 2/2005 | Fredlund et al. |
| 2005/0041286 A1 | | 2/2005 | White |
| 2007/0120879 A1 | * | 5/2007 | Kanade et al. ............. 346/107.2 |
| 2007/0153091 A1 | | 7/2007 | Watlington et al. |
| 2007/0159552 A1 | | 7/2007 | Wang et al. |
| 2007/0200925 A1 | | 8/2007 | Kim |
| 2008/0012936 A1 | | 1/2008 | White |

FOREIGN PATENT DOCUMENTS

| | | |
|---|---|---|
| JP | 06269002 A | 9/1994 |
| JP | 2000298253 A | 10/2000 |
| JP | 2003150942 A | 5/2003 |
| KR | WO2006057475 A1 | 6/2006 |
| WO | 0172037 A1 | 9/2001 |

OTHER PUBLICATIONS

ISA Korean Intellectual Property Office, International Search Report of PCT/US2009/040292, Nov. 17, 2009, Korea, 3 pages.
"Recognition of People in Low Quality Video", 2001, Language and Media Processing Laboratory, pp. 2.

(Continued)

*Primary Examiner* — Wesley Kim
(74) *Attorney, Agent, or Firm* — Alleman Hall McCoy Russell & Tuttle LLP

(57) ABSTRACT

A gaze accurate video conferencing system includes a screen that alternates between a light-scattering state and a substantially transparent state. A camera is positioned behind the screen and is configured to capture images of a user positioned in front of the screen when the screen is in its substantially transparent state. When the screen is in its substantially light-scattering state, a projector projects a display image on the screen.

20 Claims, 4 Drawing Sheets

(56) References Cited

OTHER PUBLICATIONS

Viola, et al. "Robust Real-Time Face Detection", International Journal of Computer Vision, vol. 57, No. 2, Kluwer Academic Publishers., 2004, pp. 137-154.
Barakonyi, et al. "Cascading Hand and Eye Movement for Augmented Reality Videoconferencing", Proceedings of the IEEE Symposium on 3D User Interfaces, 2007, pp. 8.
"See Eye 2 Eye", 2006, Bodelin Technologies, pp. 4.
Yang, et al., "Eye Gaze Correction with Stereovision for Video-Teleconferencing", Dec. 2001, MSR Technical Report, pp. 15.
Yang, et al., "Model-based Head Pose Tracking with Stereovision", Oct. 2001, MSR Technical Report, pp. 12.
"Image: Interrotron Web Page. jpg", retrieved at << http://en.wikipedia.org/wiki/Image:Interrotron_web_page.jpg >>, pp. 2, Sep. 2006.
Vertegaal, et al., "GAZE-2: Conveying Eye Contact in Group Video Conferencing Using Eye-Controlled Camera Direction", Proceedings of the SIGCHI Conference on Human Factors in Computing Systems, ACM, 2003, pp. 8.
Shiwa, "A Large-Screen Visual Telecommunications Device Using a Liquid-Crystal Screen to Provide Eye Contact", Presented at the 1991 SID International Symposium, Journal of the SID, vol. 1, No. 1, Copyright 1993 Society for Information Display, pp. 37-41.
European Patent Office, Extended European Search Report of EP09747081.9, Germany, Oct. 8, 2013, 7 pages.

\* cited by examiner

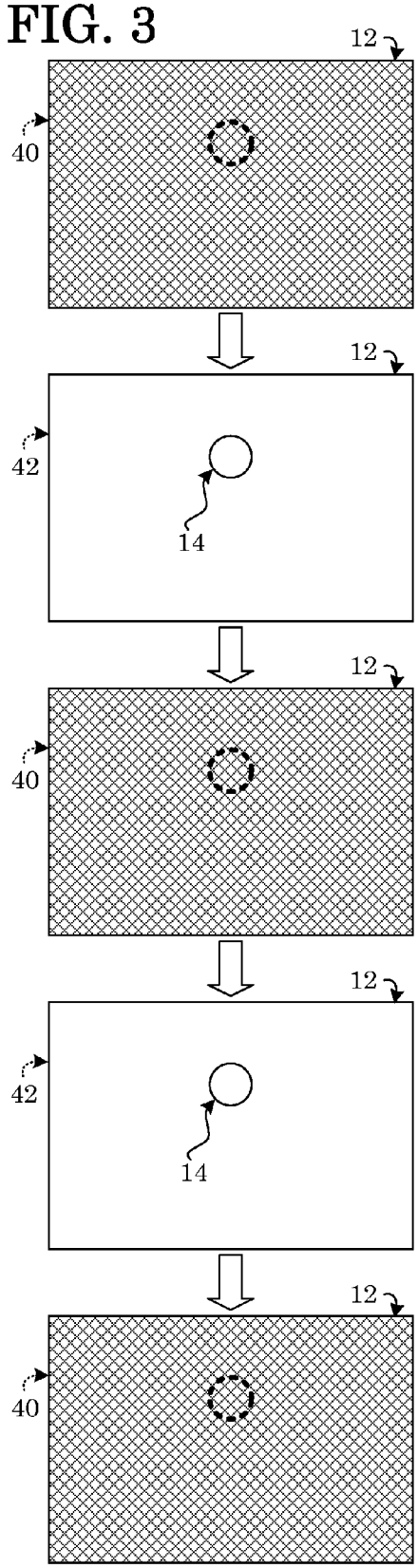
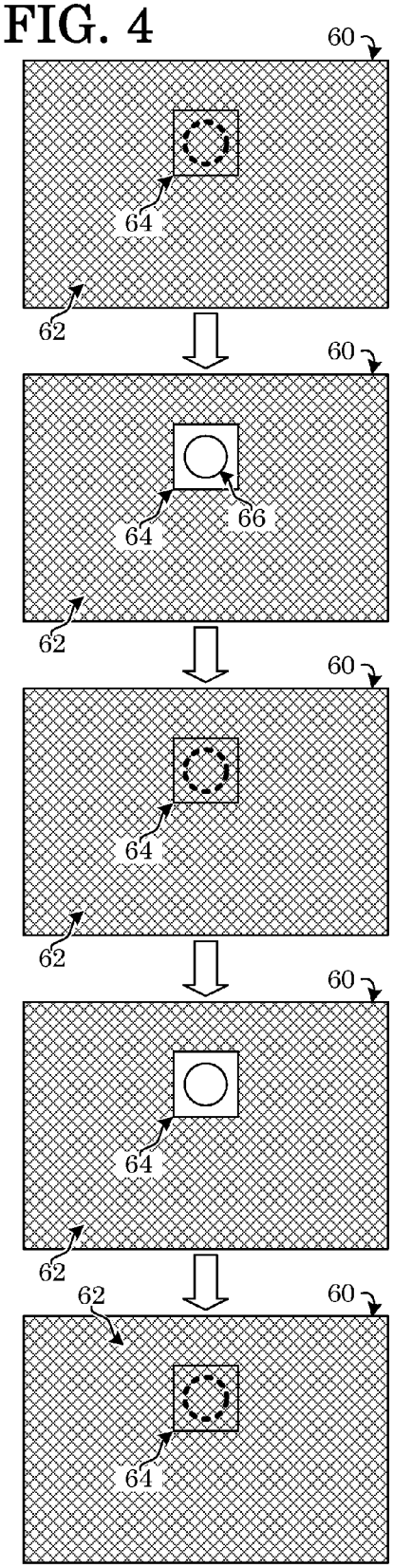

GAZE ACCURATE VIDEO CONFERENCING

BACKGROUND

Video conferencing provides two or more users in remote locations the opportunity to communicate in a manner that replicates a face-to-face conversation. As such, it is hoped that video conferencing can improve communication between remote users.

One obstacle to the widespread acceptance of video conferencing is the inability of video conferencing systems to promote socially acceptable eye contact. In most implementations, a video conferencing camera is placed at the perimeter of a video conferencing monitor, so that when a local user looks at the monitor the local user is not looking into the camera. Therefore, the remote user may not feel as if there is socially acceptable eye contact with the local user. If the local user were to look directly into the camera, so as help the remote user perceive socially acceptable eye contact, the local user would not be able to directly view the monitor displaying the remote user, and thus the local user may not perceive socially acceptable eye contact.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A gaze accurate video conferencing system includes a screen that alternates between a light-scattering state and a substantially transparent state. A camera is positioned behind the screen and is configured to capture images of a user positioned in front of the screen when the screen is in its substantially transparent state. When the screen is in its substantially light-scattering state, a projector projects a display image on the screen.

BRIEF DESCRIPTION OF THE DRAWINGS

FIG. 3 somewhat schematically shows a screen of the video conferencing system of FIG. 1 alternating between a light-scattering state and a substantially transparent state.

FIG. 4 somewhat schematically shows a window portion of a screen alternating between a light-scattering state and a substantially transparent state.

DETAILED DESCRIPTION

Figure 1:
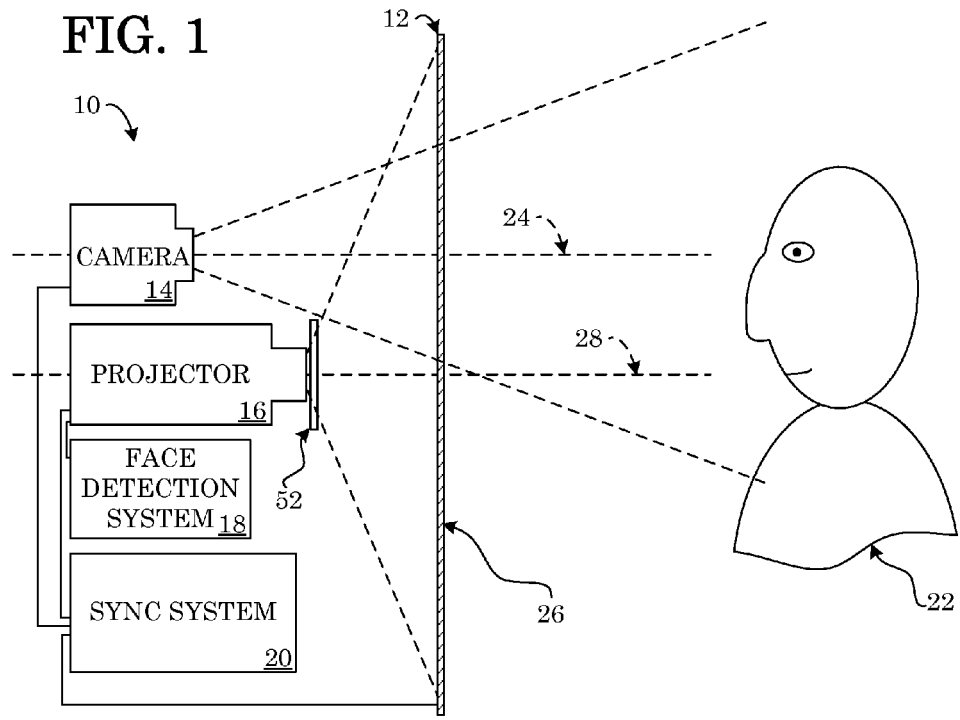
FIG. 1 shows a video conferencing system that provides gaze accurate video conferencing.

FIG. 1 shows a video conferencing system 10 that provides gaze accurate video conferencing. Video conferencing system 10 includes a screen 12, a camera 14, a projector 16, a face detection system 18, and a sync system 20. Other embodiments may not include each of these elements, and some embodiments may include elements not shown in FIG. 1.

Screen 12 is selectively switchable between a substantially transparent state and a light-scattering state. When in the substantially transparent state, a camera image of a user 22 can be viewed by camera 14. In other words, the screen does not block the image of a video conference user positioned in front of the screen from reaching the camera. As used herein, the phrase "camera image" is used to describe the image that the camera views. Because the screen does not block the view of the camera when in the substantially transparent state, camera 14 can be positioned behind screen 12. Therefore, the camera can be substantially aligned with the eyes of a face displayed on screen 12, thus allowing user 22 to look directly at camera 14 when making eye contact with the face displayed on the screen. As such, the camera image of user 22 will be gaze accurate, and other video conferencing users that view the camera image will perceive socially acceptable eye contact from user 22. As used herein, "socially acceptable eye contact" refers to one user looking less than three to five degrees away from the eyes of another user.

When in its light-scattering state, screen 12 may diffusely transmit and/or diffusely reflect light projected at the screen so that the light may be viewed as a display image. In the illustrated embodiment, screen 12 is diffusely transmitting light to user 22. In front projection applications, screen 12 may diffusely reflect light to a user. When in its light-scattering state, screen 12 also diffusely transmits, or substantially blocks, light forming the camera image, thus making viewing of the camera image through the screen more favorable when the screen is substantially transparent.

Screen 12 may include a polymer stabilized cholesteric textured liquid crystal optical shutter. In some embodiments, screen 12 may include polymer-dispersed liquid crystals. In general, any device that can rapidly alternate between a substantially transparent state and a light-scattering state may be used. The frequency of alternation and the period of transition are two characteristics that can be used to determine which type of device is suitable for a particular application. The degree of transparency and/or light scattering are other factors that can affect device suitability and/or performance in a particular application.

FIG. 1 shows camera 14 positioned to view the camera image traveling through screen 12. In FIG. 1, the optical axis 24 of camera 14 is generally perpendicular to a viewing surface 26 of screen 12. In other embodiments, the optical axis of the camera may be generally parallel with the viewing surface (e.g., camera 100 of FIG. 8), or the camera can be positioned with another orientation. Gaze accuracy and socially acceptable eye contact can be improved by aligning a camera's position and orientation with eyes of a face displayed on the screen. In that way, the camera has substantially the same view as the eyes of the face being displayed.

Camera 14 can include a variety of different image capturing mechanisms. As a nonlimiting example, camera 14 may include a charge-coupled device image sensor, a complementary metal-oxide-semiconductor image sensor, or another suitable image sensor. In some embodiments, camera 14 may be a relatively dark (e.g., black) color, and may be placed in front of a similarly dark background. In this manner, when screen 12 is in its substantially transparent state and user 22 is able to look through the screen at camera 14, the user will only see darkness. If the screen cycles between a light-scattering state and a substantially transparent state at a high enough frequency, the user may not even be able to perceive the camera and/or the darkness behind the screen when the screen is in its substantially transparent state. Instead, the user may only perceive the display image projected onto the screen when the screen is in its light-scattering state, as described below.

Projector 16 is positioned to project a display image at screen 12. Projector 16 can be virtually any type of projector, including a liquid display projector, a digital light processing projector, a liquid crystal on silicon projector, or another suitable projector.

In the illustrated embodiment, the optical axis 28 of projector 16 is generally perpendicular to viewing surface 26 of screen 12. In other embodiments, the optical axis of the projector may be generally parallel with the viewing surface (e.g., projector 86 of FIG. 8), or the projector can be positioned with another orientation.

In FIG. 1, projector 16 is shown rear projecting a display image directly onto screen 12. In other words, the projector is projecting onto the rear side of the screen, while user 22 views the front side of the screen. Projector 16 may optionally include projection optics designed for wide-angle, short-throw projection, so that the projector may be placed near screen 12. A projector also can be position for front projection onto the front side of the screen. In either rear projection or front projection implementations, a projection system may include one or more mirrors or other optical elements that effectively lengthen the projection path from the projector to the screen, and/or one or more lenses or other optical elements for removing distortion from a display image. A projection system may additionally or alternatively include one or more mirrors, lenses, or other optical elements that otherwise redirect, enlarge, shrink, focus, filter, polarize, or otherwise alter a display image between the projector and the screen.

As shown in FIG. 1, video conferencing system 10 includes a sync system 20. Sync system 20 orchestrates control of video conferencing system 10 so that the various elements of video conferencing system 10 can cooperate with one another to provide gaze accurate video conferencing. The sync system may include hardware, software, firmware, or any combination thereof. In some embodiments, the sync system may be implemented as a discrete component, while in other embodiments the sync system may include two or more components cooperating together. In some embodiments, aspects of screen 12, projector 16, camera 14, or other components of video conferencing system 10 may form part of sync system 20.

Figure 2:
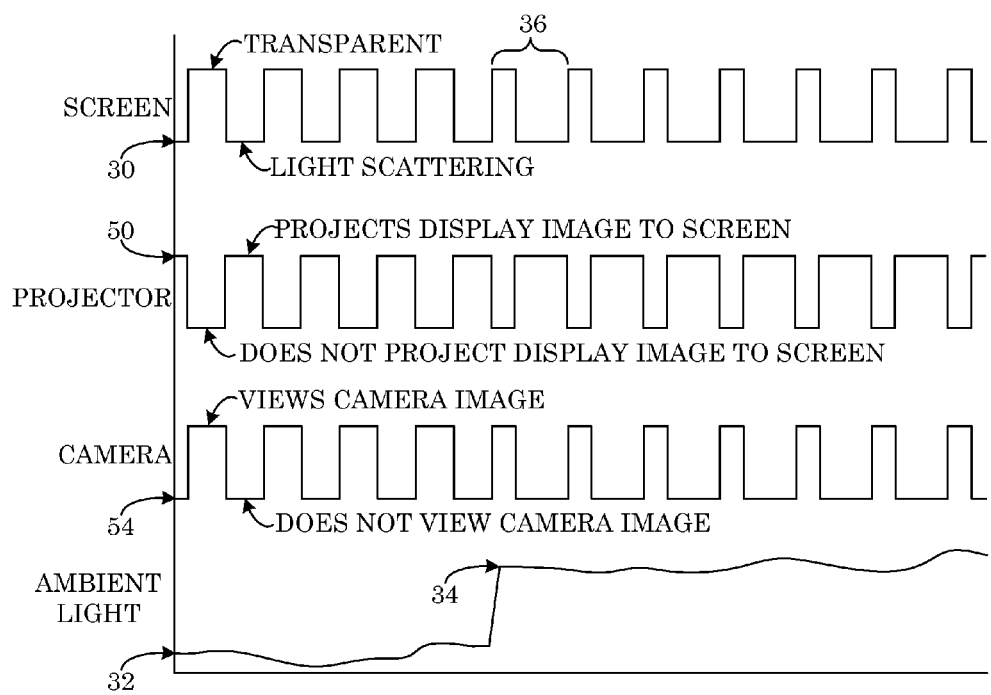
FIG. 2 shows a timing diagram for a screen, projector, and camera of the video conferencing system of FIG. 1.

FIG. 2 shows a timing diagram that indicates how sync system 20 controls screen 12, projector 16, and camera 14. As shown at 30, the sync system causes screen 12 to alternate between its substantially transparent state and its light-scattering state. The frequency and/or duty cycle at which the screen alternates between a substantially transparent state and a light-scattering state can be selected to suit a particular application.

For many video conferencing applications, a frequency in the range of approximately 50 Hertz to 120 Hertz may be acceptable, with a frequency in the range of approximately 50 Hertz to 60 Hertz believed to work well with available screen, camera, and projector technology. The above frequencies are provided as nonlimiting examples, and it should be understood that any frequency greater than the threshold for flicker perception will allow the viewer to see a stable image. High frequencies may allow for higher frame rates of the projected display image or the captured camera image. Despite potential benefits of a high screen transition frequency, faster frequencies place higher demands on the components of the video conferencing system. At a higher frequency, the camera has less time to capture the camera image. However, in some embodiments, the camera can combine exposures from multiple capture periods into one image in order to capture a desired amount of light. At higher frequencies, the screen has a larger number of transitions between the substantially transparent state and the light-scattering state, and the overall percentage of time spent making the transition, as opposed to being in either the substantially transparent state or the light-scattering state, increases. Thus, screens that are able to transition quickly, such as polymer stabilized cholesteric textured liquid crystal optical shutters, provide a greater percentage of time spent in the substantially transparent state and/or the light-scattering state.

For many video conferencing applications, a duty cycle of approximately 50% substantially transparent and 50% light-scattering may be acceptable. A higher percentage of time devoted to the substantially transparent state may facilitate capture of the camera image, but brightness of the display image may be lessened and a user may more easily perceive the camera behind the screen. A higher percentage of time devoted to the light-scattering state may facilitate projecting a bright display image, but an image sensor of the camera may generate increased noise while capturing the camera image if the exposure time becomes too small.

As shown in FIG. 2, the sync system may dynamically adjust a ratio of time the screen is in its transparent state relative to a time the screen is in its light-scattering state responsive to an ambient brightness, represented at 32 in FIG. 2. When the ambient brightness increases, as shown at 34, the sync system can devote a higher percentage of the duty cycle to the substantially light-scattering state and a corresponding lower percentage of time to the substantially transparent state, as shown at 36. With increased ambient light, the projected display image may be better viewed if the projector is given more time to form a bright display image. Similarly, with increased ambient light, it may be easier for the camera to capture a camera image with shorter exposure times. Accordingly, the sync system can be tuned to provide improved image projection by the projector and image capture by the camera in changing ambient light conditions.

FIG. 3 somewhat schematically shows screen 12 from the perspective of user 22 in FIG. 1, while the screen is alternating between its light-scattering state 40 and its substantially transparent state 42. As represented with dashed lines, camera 14 is not visible when screen 12 is in its light-scattering state, because it is behind the diffuse screen. While camera 14 may be visible if screen 12 were to remain in its substantially transparent state for an extended period of time, it should be understood that it is difficult to perceive the camera when the screen transition frequency is at least approximately 50 Hertz and/or the camera is sufficiently dark or otherwise camouflaged relative to its background.

Turning back to FIG. 2, at 50 it can be seen that the sync system can cause the projector to project the display image while the screen is in the light-scattering state. In this way, the projected display image may be diffusely transmitted to the user in an easily viewable format.

FIG. 2 also shows that the projector does not project the display image onto the screen while the screen is in the substantially transparent state. If the projector were to continue projecting a display image onto the screen, substantially undiffused light from the projector could shine directly into the eyes of user 22 while the screen was in its substantially transparent state.

It should be understood that in some embodiments, the projector may continue to project a display image, but the display image may be intercepted before being projected onto the screen. For example, FIG. 1 shows a shutter 52 that selectively blocks light projected from projector 16 from reaching screen 12 when screen 12 is in its substantially transparent state. The sync system can activate the shutter in accordance with the timing of the screen transitions.

Shutter 52 may be a mechanical shutter, an electro-mechanical shutter, an optical shutter, or virtually any other device which can selectively block the display image in sync with the screen transitions. As a nonlimiting example, shutter 52 may include a ferroelectric liquid crystal shutter that blocks the display image from reaching the screen when the screen is in its substantially transparent state. As other examples, shutter 52 may include a rotating disc with opaque and clear portions or a color wheel can be modified to include an opaque portion that blocks projection light when the screen is in its substantially transparent state.

In some embodiments, the projector may effectively turn on and off in sync with the screen transitions between the substantially transparent state and the light-scattering state. A projector may include one or more projector-light sources configured for frame-time modulation between an on state and an off state, and the sync system can cause the projector-light sources to be in the on state while the screen is in the light-scattering state and in the off state while the screen is in the substantially transparent state.

In some embodiments, an off state of the light source may be effectively achieved by continuing to power a projector lamp or other source while blacking the image out using a projection engine of the projector (e.g., a digital light processing projection image can aim mirrors of a digital micromirror device to produce an at least substantially black image). As used herein, a projector-light source configured for frame-time modulation between an on state and an off state includes a projector that uses a projection engine to effectively black out light from a lamp or other source.

Light-emitting diodes and/or lasers are nonlimiting examples of projector-light sources which may alternate between an on state and an off state at frame-time frequencies high enough to sync with screen transitions that may occur at 50 Hertz or more. Further, projector-light sources such as light-emitting diodes and/or lasers may be able to change brightness responsive to different applied currents, thus allowing for control flexibility in producing a bright display image. The maximum average brightness of many LED or laser sources is determined by the power dissipated by the source. As such, the brightness of the source can be increased during its on state beyond what would be possible if it was in the on state continuously. Therefore, a display using these sources could be nearly as bright operating at 50% duty cycle if the brightness is proportionally increased during its on interval.

Turning back to FIG. 2, at 54 it can be seen that the sync system can cause the camera to view the camera image while the screen is in the substantially transparent state. As an example, a digital exposure of the camera can be timed to occur each time the screen is in its substantially transparent state. In this way, the camera can capture images of a user on the other side of the screen, while the screen can still be used to display a projected image during the times the camera is not capturing images of the user. Further, FIG. 2 shows that the camera does not view the camera image when the screen is in its light-scattering state, as the view of the user is then blocked by the screen and the camera would only be taking pictures of the back of the screen, not of the user.

As shown in FIG. 4, a screen 60 may include a static portion 62 that remains substantially light scattering and a window portion 64 that is selectively switchable between a substantially transparent state and a light-scattering state. Such a window can provide a camera with a view to a user while the static portion of the screen remains suitable for displaying a projected image. In such embodiments, the window may be controlled by the sync system as described above. In some embodiments, the projector may be configured to project a portion of the display image on the static portion without interruption, while only projecting a portion of the display image on the window when the window is in its light-scattering state. The size of such a window can be selected to provide a camera 66 with a clear view to a video conferencing user, and the camera can be positioned to view a camera image traveling through the window portion of the screen.

Turning back to FIG. 1, video conferencing system 10 may include a face detection system 18. The face detection system can locate a face in the display image using one or more face detecting algorithms.

Figure 5:
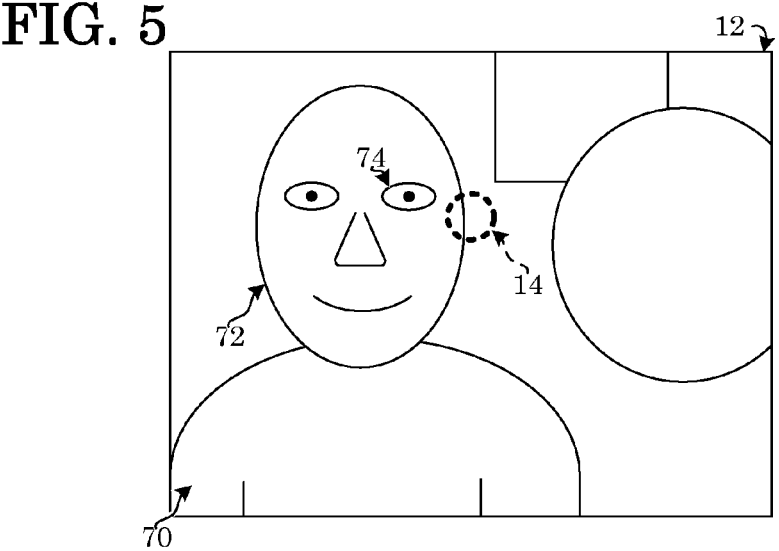
FIGS. 5-7 show the video conferencing system of FIG. 1 aligning the video conferencing camera with the eyes of a face shown as part of the display image.

FIG. 5 somewhat schematically shows screen 12 from the perspective of user 22 in FIG. 1. In the illustrated embodiment, screen 12 is displaying a display image 70 that includes a face 72. As shown, eyes 74 of face 72 are not aligned with camera 14, which is not visible behind screen 12. Face detection system 18 can locate face 72 and recognize that eyes 74 are not aligned with camera 14. Without eye to camera alignment, the video conferencing system may not promote socially acceptable eye contact.

Figure 6:
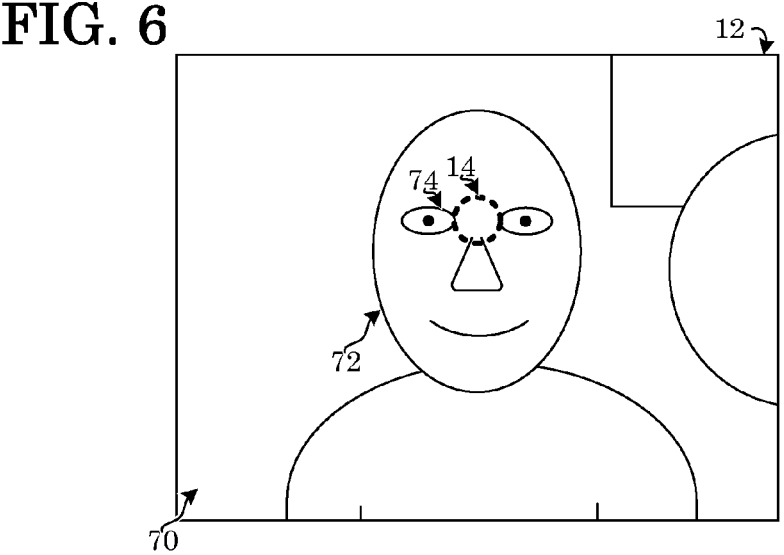

Face detection system 18 can promote socially acceptable eye contact by aligning eyes 74 with camera 14. For example, FIG. 6 schematically shows the face detection system shifting display image 70 down and to the right so that eyes 74 are aligned with camera 14. In this way, a user that looks directly at eyes 74 will also look directly at camera 14. A display image can be shifted by panning the image, stretching one edge of the image while contracting an opposite edge of the image, or through virtually any other suitable technique.

Figure 7:
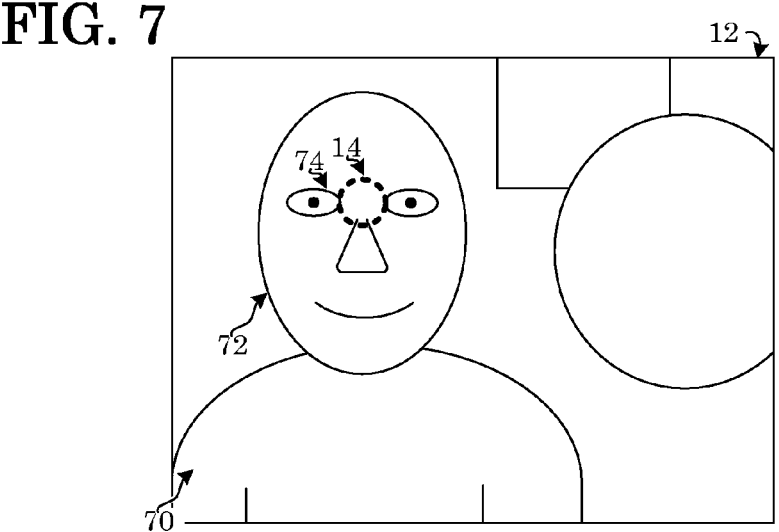

As another example, FIG. 7 schematically shows the face detection system shifting camera 14 up and to the left so that eyes 74 are aligned with camera 14. The camera may be mounted on a tracking device that allows the face detection system to reposition the camera.

Figure 8:
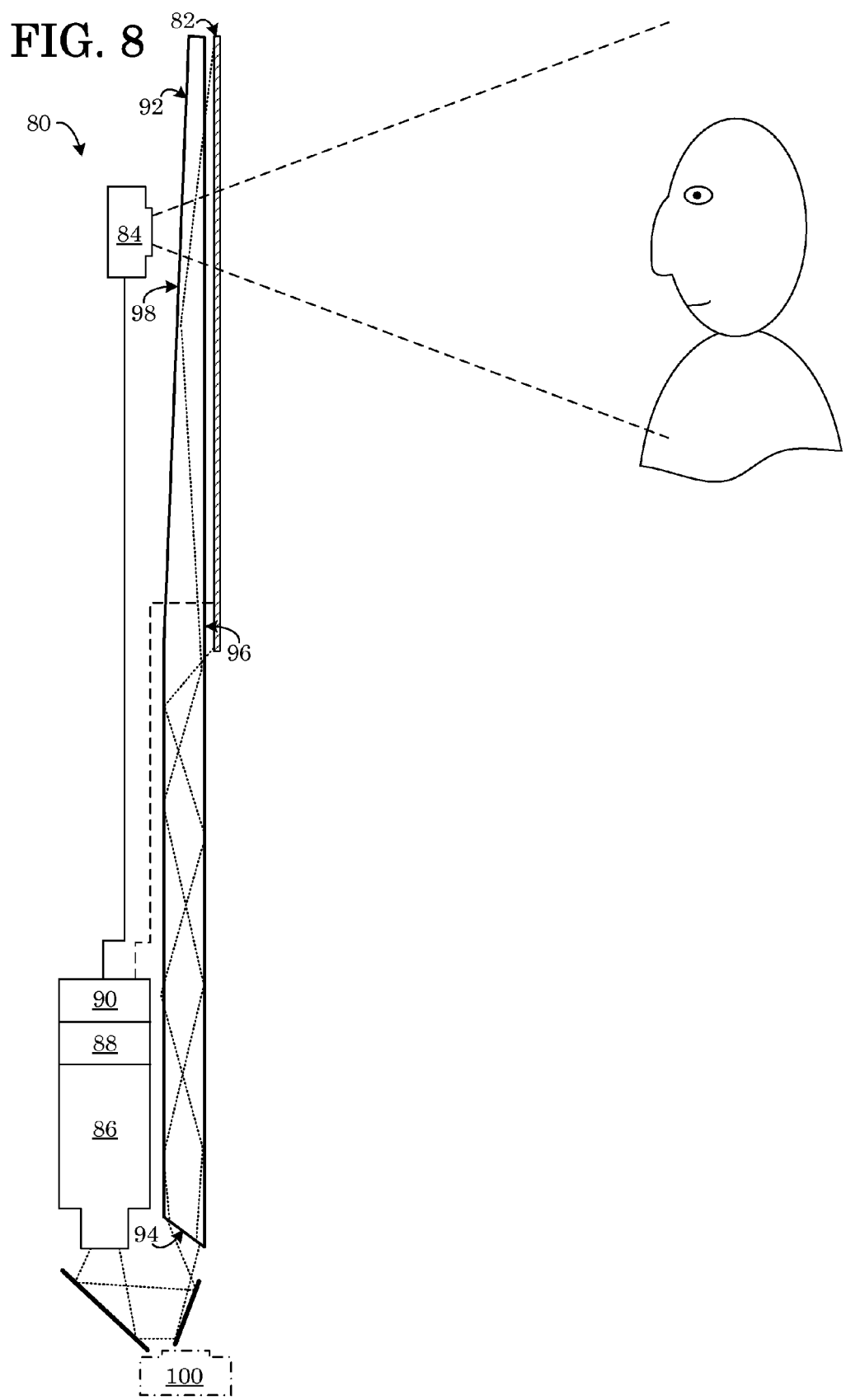
FIG. 8 shows another video conferencing system that provides gaze accurate video conferencing.

FIG. 8 shows another embodiment of a video conferencing system 80 that provides gaze accurate video conferencing. Video conferencing system 80 includes a screen 82, a camera 84, a projector 86, a face detection system 88, and a sync system 90, similar to those described above with reference to FIG. 1. Video conferencing system 80 also includes a waveguide 92 having an input edge 94 and a viewing surface 96. The waveguide is configured to receive a display image at the input edge and output the display image from the viewing surface. As shown, in this arrangement, projector 86 is positioned to project the display image into the input edge, through the waveguide, and out of the viewing surface.

At least a portion of a display image projected into the waveguide totally internally reflects upon reaching the interface between the waveguide and air. With each reflection, the direction of the light making up the display image changes with respect to the reflecting surface of the waveguide. Repeated reflections cause the light that makes up the display image to become less susceptible to total internal reflection until the light eventually emerges out viewing surface 96. The number of reflections that will occur before the light exits the viewing surface is proportional to the position on the viewing surface from which the light will exit. Therefore, the angle at which light is projected into the input edge can be modulated to control at which position it will exit the viewing surface. In this way, light entering input edge 94 can be controlled so as to exit viewing surface 96 at a desired position, and the waveguide can effectively be used to enlarge the display image in a device having a thin profile.

Screen 82 can be sized and positioned to substantially cover the viewing surface of the waveguide. Sync system 90 can be used to control screen 82, camera 84, and projector 86 as described above with reference to FIG. 2.

In some embodiments, camera 84 may be positioned to view a camera image that passes into viewing surface 96 and out a backside 98 of the waveguide. In other embodiments, a camera 100 may be positioned to view a camera image traveling into viewing surface 96, through waveguide 92 and out through input edge 94. Such a camera may be offset relative to projector 86. In some embodiments, a projector may be positioned to project directly into input edge 94, while in other embodiments the projector may be positioned to project into one or more mirrors that redirect projected light into the input edge. Further, in some embodiments, the waveguide itself may include one or more folds or bends that decrease its overall length.

It should be understood that various other components may be used to improve video conferencing performance. For example, a clear protective screen may be added to the above described embodiments so as to help protect the screen that alternates between the light-scattering state and the substantially transparent state. In some embodiments, a polarizer and/or prismatic turning film may be used to condition light for better display and/or image capture.

The above described video conferencing systems can include a camera-based touch-detection system that images a screen during its light-scattering state to detect fingers or other objects touching the screen, so that such touches can be recognized as a form of user input. In some embodiments, such touch detection systems may utilize infrared light and/or infrared cameras to monitor touch inputs.

It should be understood that the above described video conferencing systems are compatible with virtually any projection-based display. For example, the above described video conferencing systems are compatible with the design of commercially available projection televisions, surface computers, and other devices.

It will be appreciated that the embodiments described herein may be implemented, for example, via computer-executable instructions or code, such as programs, stored on computer-readable storage media and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including two or more such devices acting in concert.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A video conferencing system, comprising:
    a waveguide having an input edge, a back surface, and a viewing surface opposite the back surface, the waveguide being configured to receive a display image at the input edge and output the display image from the viewing surface;
    a projector positioned to project the display image into the input edge, through the waveguide, and out of the viewing surface;
    a camera positioned to view a camera image traveling into the viewing surface, through the waveguide, and out the back surface;
    a screen substantially covering the viewing surface of the waveguide and configured to selectively switch between a substantially transparent state and a light-scattering state; and
    a sync system configured to cause the screen to alternate between the substantially transparent state and the light-scattering state, configured to cause the camera to view the camera image while the screen is in the substantially transparent state, and configured to cause the projector to project the display image into the input edge while the screen is in the light-scattering state.

2. The video conferencing system of claim 1, where the screen includes a polymer stabilized cholesteric textured liquid crystal optical shutter.

3. The video conferencing system of claim 1, where the projector includes one or more projector-light sources configured for frame-time modulation between an on state and an off state, and the sync system is configured to cause the projector-light sources to be in the on state while the screen is in the light-scattering state.

4. The video conferencing system of claim 1, where an optical axis of the projector is generally parallel with the viewing surface.

5. The video conferencing system of claim 1, where an optical axis of the camera is generally perpendicular to the viewing surface.

6. The video conferencing system of claim 1, where an optical axis of the camera is generally parallel with the viewing surface.

7. The video conferencing system of claim 1, where the sync system is configured to dynamically adjust a ratio of time the screen is in the substantially transparent state relative to a time the screen is in the light-scattering state responsive to changes in an ambient brightness.

8. The video conferencing system of claim 1, further comprising a face detection system configured to locate a face in the display image and align eyes of the face with the camera.

9. The video conferencing system of claim 8, where the display image is shifted on the screen to align eyes of the face with the camera.

10. The video conferencing system of claim 8, where the camera is moved to align eyes of the face with the camera.

11. The video conferencing system of claim 1, where the screen includes a static portion that remains substantially light scattering and a window portion that is selectively switchable between the substantially transparent state and the light-scattering state, and where the camera is positioned to view a camera image traveling through the window portion of the screen.

12. The video conferencing system of claim 1, where the sync system includes a ferroelectric liquid crystal shutter that blocks the display image from reaching the screen when the screen is in the substantially transparent state.

13. A video conferencing system, comprising:
a waveguide having an input edge, a back surface, and a viewing surface opposite the back surface, the waveguide being configured to receive a display image at the input edge and output the display image from the viewing surface;
a screen substantially covering the viewing surface of the waveguide and configured to selectively switch between a substantially transparent state and a light-scattering state;
a camera positioned to view a camera image traveling through the screen, into the viewing surface, and out of a back side of the waveguide;
a projector positioned to project a display image at the screen through the waveguide;
a face detection system to locate a face in the display image and move the face within the display image so as to align eyes of the face with the camera; and
a sync system configured to cause the screen to alternate between the substantially transparent state and the light-scattering state, configured to cause the camera to view the camera image while the screen is in the substantially transparent state, and configured to cause the projector to project the display image while the screen is in the light-scattering state.

14. The video conferencing system of claim 13, where the screen includes a polymer stabilized cholesteric textured liquid crystal optical shutter.

15. The video conferencing system of claim 13, where the projector includes one or more projector-light sources configured for frame-time modulation between an on state and an off state, and the sync system is configured to cause the projector-light sources to be in the on state while the screen is in the light-scattering state.

16. The video conferencing system of claim 13, where the sync system is configured to dynamically adjust a ratio of time the screen is in the substantially transparent state relative to a time the screen is in the light-scattering state responsive to an ambient brightness.

17. The video conferencing system of claim 13, where the display image is shifted on the screen to align eyes of the face with the camera.

18. The video conferencing system of claim 13, where the camera is moved to align eyes of the face with the camera.

19. The video conferencing system of claim 13, where the screen includes a static portion that remains substantially light scattering and a window portion that is selectively switchable between the substantially transparent state and the light-scattering state, and where the camera is positioned to view a camera image traveling through the window portion of the screen.

20. A video conferencing system, comprising:
a waveguide having an input edge, a back surface, and a viewing surface opposite the back surface, the waveguide being configured to receive a display image at the input edge and output the display image from the viewing surface;
a screen substantially covering the viewing surface of the waveguide and selectively switchable between a substantially transparent state and a light-scattering state;
a projector including one or more projector-light sources configured for frame-time modulation between an on state and an off state, the projector being configured to project the display image into the input edge, through the waveguide, and out of the viewing surface towards the screen only when the projector-light sources are in the on state;
a camera positioned to view a camera image traveling through the screen, into the viewing surface, through the waveguide, and out the back surface; and
a sync system configured to cause the screen to alternate between the substantially transparent state and the light-scattering state, configured to cause the camera to view the camera image while the screen is in the substantially transparent state, and configured to cause the projector-light sources to be in the on state while the screen is in the light-scattering state, where the sync system is configured to dynamically adjust a ratio of time the screen is in the substantially transparent state relative to a time the screen is in the light-scattering state responsive to changes in an ambient brightness.

* * * * *